United States Patent
Dalmia et al.

(10) Patent No.: US 10,657,004 B1
(45) Date of Patent: May 19, 2020

(54) SINGLE-TENANT RECOVERY WITH A MULTI-TENANT ARCHIVE

(71) Applicant: Amazon Technologies, Inc., Seattle, WA (US)

(72) Inventors: Pranay Shirish Dalmia, Seattle, WA (US); Jonathan Edward Hughes, Seattle, WA (US); Jesse Paul Morgan, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 509 days.

(21) Appl. No.: 14/665,742

(22) Filed: Mar. 23, 2015

(51) Int. Cl.
G06F 11/14 (2006.01)
G06F 16/11 (2019.01)

(52) U.S. Cl.
CPC ........ G06F 11/1446 (2013.01); G06F 16/128 (2019.01)

(58) Field of Classification Search
None
See application file for complete search history.

(56) References Cited

U.S. PATENT DOCUMENTS

| | | | | |
|---|---|---|---|---|
| 6,981,114 B1* | 12/2005 | Wu | ...................... | G06F 11/1469 711/112 |
| 7,162,601 B2* | 1/2007 | Yamagami | .......... | G06F 11/1471 707/999.202 |
| 7,467,267 B1* | 12/2008 | Mayock | .............. | G06F 11/1461 707/999.202 |
| 8,224,784 B2 | 7/2012 | Henrickson | | |
| 8,548,952 B2 | 10/2013 | Weissman et al. | | |
| 8,595,191 B2* | 11/2013 | Prahlad | ............. | G06F 17/30091 707/654 |
| 8,600,944 B2 | 12/2013 | Bryant et al. | | |
| 8,707,264 B2 | 4/2014 | Hossain et al. | | |
| 8,825,601 B2 | 9/2014 | Huynh Huu et al. | | |
| 9,558,078 B2* | 1/2017 | Farlee | ................. | G06F 11/1471 |
| 2008/0077629 A1* | 3/2008 | Lorenz | ................. | G06F 3/0608 |

(Continued)

OTHER PUBLICATIONS

David Shue, Michael Freedman, Anees Shaikh, "Performance Isolation and Fairness for Multi-Tenant Cloud Storage", 2012, Princeton University, 10th USENIX Symposium on Operating Systems Design and Implementation (OSDI '12), pp. 349-362.*

Primary Examiner — Mark D Featherstone
Assistant Examiner — Ranjit P Doraiswamy
(74) Attorney, Agent, or Firm — Robert C. Kowert; Kowert, Hood, Munyon, Rankin & Goetzel, P.C.

(57) ABSTRACT

Methods, systems, and computer-readable media for single-tenant recovery with a multi-tenant archive are disclosed. A snapshot of a data store is stored at a first point in time. The data store comprises data elements provided by a plurality of clients. Incremental changes to the data store are stored after the first point in time. The incremental changes comprise changes to the data elements provided by the clients. A request is received to restore a particular subset of the data elements to a second point in time. The particular subset of the data elements are owned by a particular client. The particular subset of the data elements from the snapshot and a particular subset of the incremental changes are restored. The particular subset of the incremental changes comprise incremental changes to the particular subset of the data elements stored between the first and second points in time.

20 Claims, 10 Drawing Sheets

(56) References Cited

U.S. PATENT DOCUMENTS

| | | | |
|---|---|---|---|
| 2010/0211548 A1* | 8/2010 | Ott | G06F 17/30575 707/655 |
| 2011/0161295 A1* | 6/2011 | Ngo | G06F 11/1471 707/639 |
| 2012/0079221 A1* | 3/2012 | Sivasubramanian | G06F 11/1456 711/162 |
| 2014/0089266 A1* | 3/2014 | Une | G06F 11/1469 707/679 |

* cited by examiner

SINGLE-TENANT RECOVERY WITH A MULTI-TENANT ARCHIVE

BACKGROUND

Numerous business applications are being migrated to "cloud" environments in recent years. Data centers housing significant numbers of interconnected computing systems for cloud-based computing have become commonplace, including both private data centers (that are operated by and on behalf of a single organization) and public data centers (that are operated by entities as businesses to provide computing resources to customers). In addition to core computing resources, operators of some data centers implement a variety of advanced network-accessible services, including, for example, distributed database services, object storage services, and the like. By using the resources of provider networks, clients can scale their applications up and down as needed, often at much lower costs than would have been required if the required computing infrastructure were set up on a client-by-client basis. Using virtualization techniques, provider network operators may often use a given hardware server on behalf of many different clients while maintaining high service quality levels for each of the clients. Sharing resources via such virtualization-based multi-tenancy may enable the provider network operators to increase hardware utilization levels, thereby matching resource demand with supply more efficiently and keeping costs low.

Clients of network-accessible storage resources may expect and even require a certain level of data durability. Accordingly, operators of provider networks may implement backup policies for the shared storage resources. For example, the backup policies may guarantee that periodic backups will be maintained for a certain number of days, weeks, or even months. However, the expense of generating and maintaining such backups may be considerable.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for single-tenant recovery with a multi-tenant archive are described. Using the techniques described herein, data for a single client (also referred to herein as a tenant) may be restored to a multi-tenant data store using a multi-tenant archive of the data store. During normal operation of the data store, snapshots of the entire data store may be generated and stored periodically by an archiving system. Between snapshots, incremental changes to the entire data store may also be captured and stored to a change log by the archiving system. In the multi-tenant archive (e.g., in the snapshots and change log), data elements may not be segregated or partitioned by client; in other words, archived data for one client may be mixed or interleaved with archived data for other clients. Upon request, client-specific data elements may be retrieved from one of the snapshots and restored to the multi-tenant archive. Client-specific incremental changes up to a particular point in time may also be retrieved from the archiving system and restored to the multi-tenant archive. The client-specific data may relate to a particular scope or table, and the individual data elements in the archive may be identified by metadata that identifies the scope or table. The recovery process may be implemented in a distributed manner using a fleet of workers that take recovery jobs from a queue. In this manner, client-specific data may be restored to a multi-tenant data store efficiently and without incurring additional archiving costs for the data store.

Figure 1:
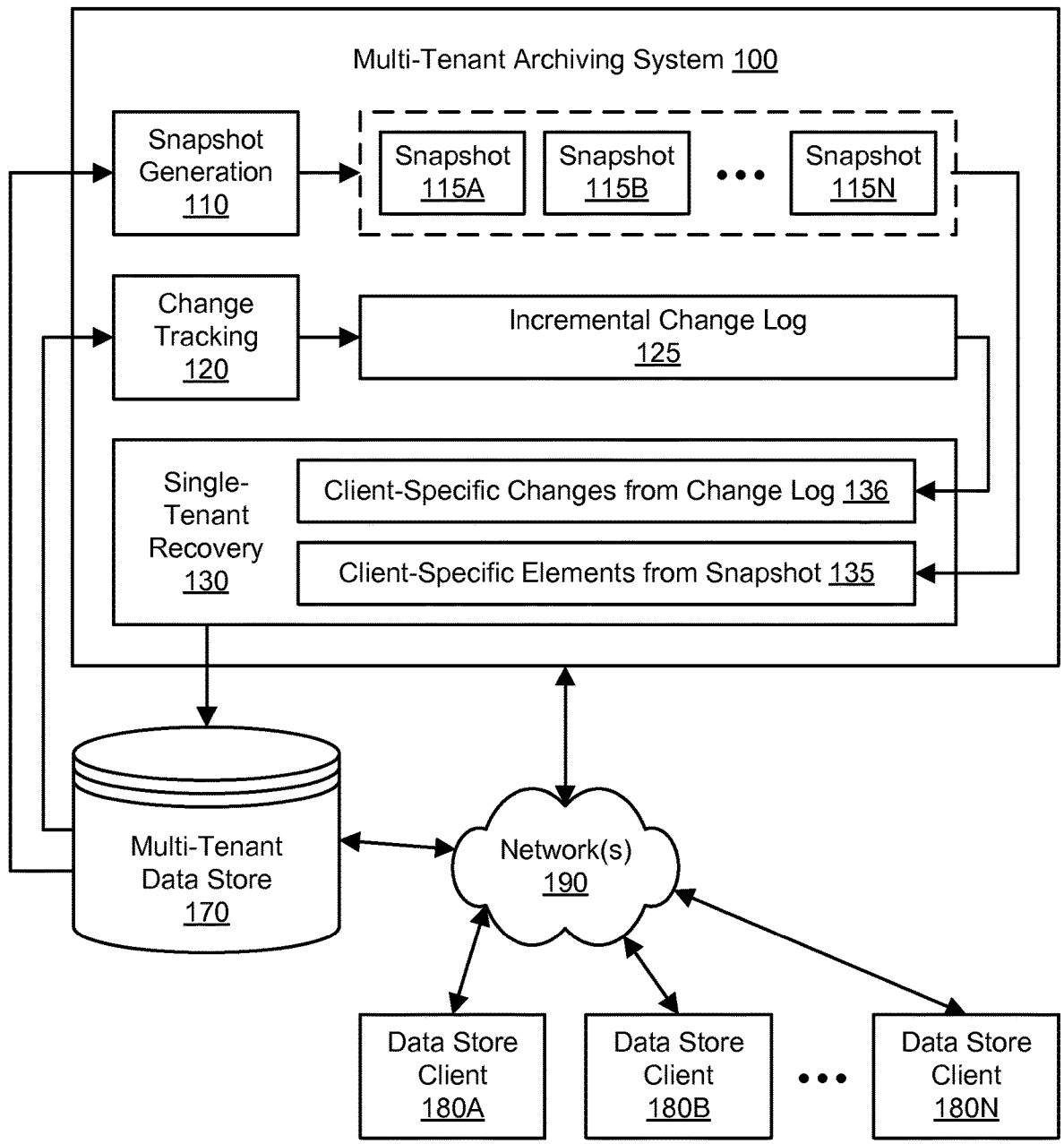
FIG. 1 illustrates an example system environment for single-tenant recovery with a multi-tenant archive, according to one embodiment.

FIG. 1 illustrates an example system environment for single-tenant recovery with a multi-tenant archive, according to one embodiment. The example system environment may include a multi-tenant archiving system 100 that maintains an archive of data elements in a multi-tenant data store 170. The multi-tenant data store 170 may store data elements on behalf of a plurality of clients (also referred to herein as tenants). The data elements may include key-value pairs, and the key-value pairs may be organized into data structures referred to as scopes. The data elements (e.g., key-value pairs) and/or data structures that contain them (e.g., scopes or tables) may be specific to particular clients, such that a particular data element or data structure may be said to belong to a particular client or to be owned by a particular client. The client that owns particular data elements may have access to read, write, or modify those data elements, in some cases exclusive of other clients. Clients may use devices such as data store clients 180A-180N to perform or request suitable operations for reading, writing, or modifying data elements in the multi-tenant data store 170. The multi-tenant data store 170 may expose suitable interfaces, such as application programming interfaces (API) for "put" and "get," to enable clients to participate in such operations. The multi-tenant archiving system 100, multi-tenant data store 170, and data store clients 180A-180N may be coupled to one another through one or more networks 190.

The multi-tenant data store 170 may be operated as part of a provider network. A provider network may include a network set up by an entity (such as a company or a public sector organization) to provide one or more services (such as various types of multi-tenant and/or single-tenant cloud-based computing or storage services) accessible via the Internet and/or other networks to a distributed set of clients. A provider network may include numerous data centers hosting various resource pools, such as collections of physical and/or virtualized computer servers, storage devices, networking equipment and the like, needed to implement, configure and distribute the infrastructure and services offered by the provider. Within large provider networks, some data centers may be located in different cities, states, or countries than others, and in some embodiments the resources allocated to a given application or service may be distributed among several such locations to achieve desired levels of availability, fault-resilience, and performance.

Access to the multi-tenant data store 170 may be provided using one or more storage-related services, such as a relational database service, a non-relational or NoSQL database service, an object storage service that allows clients to store arbitrary amounts of data in the form of unstructured objects that can be accessed using web-services interfaces, a storage service that provides block-device level interfaces, and so on. A client of such a storage-related service may programmatically request the establishment of portion of the data store 170, such as an instance of a (relational or non-relational) database that can be used for numerous database tables or scopes and associated metadata such as indexes and the like. In the case of an object storage service, at least a portion of the data store 170 may include a collection of unstructured objects. In the case of a storage service providing block-device interfaces, the data store 170 may be implemented using one or more volumes. Generally speaking, the term "data store," as used herein, may refer to a collection of one or more data objects and associated metadata set up on behalf of one or more clients. After a data store has been created, a client may start populating various data objects within the data store, e.g., using requests for operations such as "create object," "update object," "insert object," "delete object," or other similar requests at various granularity levels depending in the data store type. For example, in the case of a database, operations such as creates, updates, and deletes may be supported at the table level, the record level, and for various metadata objects such as indexes, views, and the like. Clients may also issue read requests of various kinds, such as queries in the case of database objects.

Clients may interact with the multi-tenant data store 170 and/or multi-tenant archiving system 100 using one or more client devices, such as data store clients 180A and 180B through 180N. Although three data store clients 180A, 180B, and 180N are shown for purposes of illustration and example, it is contemplated that any suitable number and configuration of data store clients may interact with multi-tenant data store 170 and/or multi-tenant archiving system 100. The data store clients 180A-180N may be implemented using any suitable number and configuration of computing devices, any of which may be implemented by the example computing device 3000 illustrated in FIG. 8. The computing devices may be located in any suitable number of data centers or geographical locations.

The multi-tenant archiving system 100 may include various components, modules, or other functionalities such as a snapshot generation functionality 110, a change tracking functionality 120, and a single-tenant recovery functionality 130. The multi-tenant archiving system 100 may be implemented using any suitable number and configuration of computing devices, any of which may be implemented by the example computing device 3000 illustrated in FIG. 8. The computing devices may be located in any suitable number of data centers or geographical locations. In various embodiments, the functionality of the different components of the multi-tenant archiving system 100 may be provided by the same computing device or by different computing devices. If any of the components of the multi-tenant archiving system 100 are implemented using different computing devices, then the components and their respective computing devices may be communicatively coupled, e.g., via network(s) 190. Each of the components of the multi-tenant archiving system 100 may represent any combination of software and hardware usable to perform their respective functions, as discussed as follows. Operations implemented by the multi-tenant archiving system 100 may be performed automatically, e.g., without a need for user initiation or user intervention after an initial configuration stage, and programmatically, e.g., by execution of program instructions on a computing device. It is contemplated that the multi-tenant archiving system 100 may include additional components not shown, fewer components than shown, or different combinations, configurations, or quantities of the components shown.

In one embodiment, the snapshot generation functionality 110 may generate and store a plurality of snapshots of the multi-tenant data store, such as snapshots 115A and 115B through 115N. Although three snapshots 115A, 115B, and 115N are shown for purposes of illustration and example, it is contemplated that any suitable number of snapshots may be used with the multi-tenant archiving system 100. The multi-tenant data store 170 may include a plurality of data elements that are provided by and stored on behalf of a plurality of clients. In one embodiment, the data elements may include key-value pairs, and each key-value pair may belong to at least one data structure referred to as a scope. The scopes may be client-specific. In one embodiment, each of the snapshots 115A-115N may include all or substantially all of the data elements stored in the data store 170 at the particular point in time at which the snapshot was captured, including data elements owned by multiple clients. In each of the snapshots 115A-115N, the data elements may not be segregated or partitioned by client; in other words, archived data for one client may be mixed or interleaved with archived data for other clients within a snapshot. The snapshots 115A-115N may be generated based on a schedule or otherwise on a recurring or repeated basis. Accordingly, the various snapshots 115A-115N may be generated and stored at a plurality of different points in time. The snapshots may be kept in the archiving system 100 for at least a guaranteed duration of time, and the oldest snapshot may be removed when its expiration time has been reached. Any suitable storage service or subsystem may be used to store the snapshots 115A-115N.

In one embodiment, the data store 170 may include a plurality of partitions, and each of the snapshots 115A-115N may include a plurality of partition snapshots. Each of the partition snapshots may include contents (e.g., data elements) of one or more corresponding partitions at the time the snapshot was taken. For a given one for the snapshots 115A-115N, the creation dates of the constituent partition snapshots may vary. The data elements for a particular client may be distributed among multiple partitions, and some partitions may include data elements for other clients in addition to data elements for the particular client.

In one embodiment, the change tracking functionality 120 may capture and store a plurality of incremental changes to the multi-tenant data store 170. The incremental changes may represent changes from one snapshot to another snapshot. In one embodiment, the incremental changes may reflect changes with respect to the most recent snapshot. The incremental changes may include changes to the data elements (e.g., the key-value pairs) provided by the clients, such as additions of data elements, deletions of data elements, modifications to data elements (e.g., modifications to values in key-value pairs), additions of scopes, deletions of scopes, modifications to scopes, and/or other suitable changes. The incremental changes may include changes to data elements for a plurality of clients. The incremental changes may be stored in an incremental change log 125. In the change log 125, the data elements may not be segregated or partitioned by client; in other words, archived data for one client may be mixed or interleaved with archived data for other clients within the change log. In one embodiment, the incremental change log 125 may keep change information as far back as the oldest snapshot in the archiving system 100. Any suitable storage service or subsystem may be used to store the incremental change log 125.

In one embodiment, the single-tenant recovery functionality 130 may restore client-specific data elements and incremental changes to the multi-tenant data store 170. In one embodiment, a particular client or an administrator may send (e.g., to the archiving system 100) a request to restore data. The request may be sent using a user interface, application programming interface, or other suitable interface. The request may specify a particular subset of the data elements to restore to the multi-tenant data store 170. For example, the request may specify one or more particular scopes or other collections of key-value pairs to be restored. The specified subset of data elements may be client-specific (i.e., tenant-specific), and the particular subset may belong to a client who issued the request. The request may also specify a particular point in time for the restore operation. By specifying the point in time for the restore operation, the request may represent an instruction to restore the specified subset of data elements to their state in the data store at that point in time. The restore operation may also be referred to herein as a rollback, e.g., to the specified point in time.

Based on the request, the single-tenant recovery functionality 130 may retrieve the relevant portions of the data elements and incremental changes from the archive and restore them to the multi-tenant data store 170. Accordingly, the single-tenant recovery functionality 130 may retrieve the specified subset of data elements from the relevant snapshot stored by the archiving system 100. In one embodiment, the single-tenant recovery functionality 130 may select the most recent snapshot taken prior to the point in time specified for the restore. The client-specific data elements 135 in the snapshot may be identified by metadata that represents a client-specific identifier, such as the identifier of a scope belonging to a client requesting the restore operation (or a client on whose behalf the restore operation is initiated by an administrator). The client-specific metadata may include a particular prefix (e.g., to the key in a key-value pair), and the particular prefix may indicate membership in the particular subset of data elements specified in the request. Accordingly, the snapshot may be filtered to obtain all data elements 135 matching the client-specific identifier. The client-specific data elements 135 may then be restored to the multi-tenant data store 170. In one embodiment, the data elements (e.g., key-value pairs) 135 may be restored by replaying or publishing them into the appropriate scopes(s) or other data structures in the data store 170. The restoration may be throttled to limit any given restore operation to a configurable number of transactions per second.

Additionally, the single-tenant recovery functionality 130 may retrieve the relevant incremental changes 136 from the change log 125 stored by the archiving system 100. The relevant incremental changes 136 may relate to the specified subset of data elements in the restore request. The relevant incremental changes 136 may be client-specific. In the change log 125, the relevant incremental changes 136 may be timestamped after the time at which the relevant snapshot was taken (e.g., the snapshot that provided the client-specific data elements 135) and up to and including the point in time specified in the request to restore. The individual changes in the change log 125 may be identified by metadata that represents a client-specific identifier, such as the identifier of a scope belonging to the client requesting the restore operation (or a client on whose behalf the restore operation is initiated by an administrator). The client-specific metadata may include a particular prefix (e.g., to the key in a key-value pair), and the particular prefix may indicate membership in the particular subset of data elements specified in the request. Accordingly, the change log 125 may be filtered to obtain all incremental changes 136 matching the client-specific identifier and falling within the relevant window of time. The relevant changes 136 may indicate changes to the data elements (e.g., the key-value pairs) for which the restore operation is requested, such as additions of data elements, deletions of data elements, modifications to data elements (e.g., modifications to values in key-value pairs), additions of scopes, deletions of scopes, modifications to scopes, and/or other suitable changes. The subset of the incremental changes 136 retrieved from the change log 125 may then be restored to the multi-tenant data store 170. In one embodiment, the incremental changes may be restored by replaying or publishing them into the appropriate scopes(s) or other data structures in the data store 170.

Figure 2:
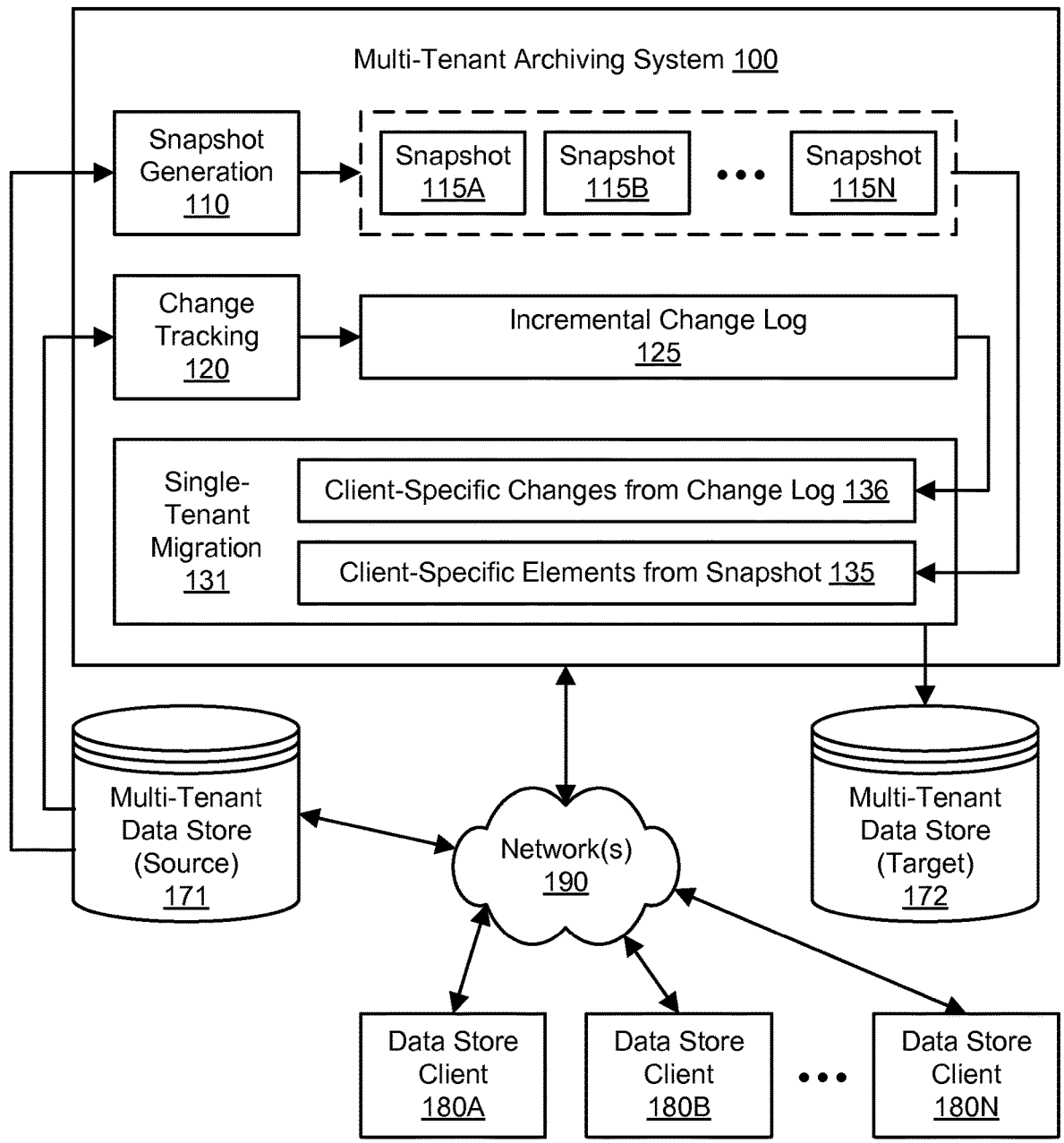
FIG. 2 illustrates further aspects of the example system environment for single-tenant recovery with a multi-tenant archive, including single-tenant migration from a multi-tenant archive to another archive, according to one embodiment.

FIG. 2 illustrates further aspects of the example system environment for single-tenant recovery with a multi-tenant archive, including single-tenant migration from a multi-tenant archive to another archive, according to one embodiment. In one embodiment, data elements may be migrated from one data store to another data store using techniques similar to those discussed above with respect to FIG. 1. As shown in FIG. 2, the snapshot generation functionality 110 may generate and store a plurality of snapshots of the multi-tenant data store 171, such as snapshots 115A and 115B through 115N. Additionally, the change tracking functionality 120 may capture and store a change log 125 that includes incremental changes to the multi-tenant data store 171. Accordingly, the multi-tenant data store 171 may represent an original or source data store relative to the snapshots 115A-115N and change log 125.

In one embodiment, the single-tenant migration functionality 131 may migrate client-specific data elements and incremental changes archived from the original data store 171 to another multi-tenant data store 171. Accordingly, the multi-tenant data store 172 may represent a new or target data store relative to the snapshots 115A-115N and change log 125. In one embodiment, a particular client or an administrator may send (e.g., to the archiving system 100) a request to migrate data. The request may be sent using a user interface, application programming interface, or other suitable interface. The request may specify the new multi-tenant data store 172 as the target of the migration and/or the original multi-tenant data store 171 as the source of the migration. The request may specify a particular subset of the data elements to migrate. For example, the request may specify one or more particular scopes or other collections of key-value pairs to be migrated. The specified subset of data elements may be client-specific (i.e., tenant-specific), and the particular subset may belong to a client who issued the request. The request may also specify a particular point in time for the migrate operation. By specifying the point in time for the migrate operation, the request may represent an instruction to add, to the target data store 172, the specified subset of data elements to their state as found in the source data store 171 at the specified point in time.

Based on the request, the single-tenant migration functionality 131 may retrieve the relevant portions of the data elements and incremental changes from the archive and migrate them to the target multi-tenant data store 172. Accordingly, the single-tenant migration functionality 131 may retrieve the specified subset of data elements from the relevant snapshot stored by the archiving system 100. In one embodiment, the single-tenant migration functionality 131 may select the most recent snapshot taken prior to the point in time specified for the migration. The client-specific data elements 135 in the snapshot may be identified by metadata that represents a client-specific identifier, such as the identifier of a scope belonging to the client requesting the migrate operation (or a client on whose behalf the migrate operation is initiated by an administrator). The client-specific metadata may include a particular prefix (e.g., to the key in a key-value pair), and the particular prefix may indicate membership in the particular subset of data elements specified in the request. Accordingly, the snapshot may be filtered to obtain all data elements 135 matching the client-specific identifier. The client-specific data elements 135 may then be migrated to the multi-tenant data store 172. In one embodiment, the data elements (e.g., key-value pairs) 135 may be migrated by replaying or publishing them into the appropriate scopes(s) or other data structures in the data store 172.

Additionally, the single-tenant migration functionality 131 may retrieve the relevant incremental changes 136 from the change log 125 stored by the archiving system 100. The relevant incremental changes 136 may relate to the specified subset of data elements in the migrate request. The relevant incremental changes 136 may be client-specific. In the change log 125, the relevant incremental changes 136 may be timestamped after the time at which the relevant snapshot was taken (e.g., the snapshot that provided the client-specific data elements 135) and up to and including the point in time specified in the request to migrate. The individual changes in the change log 125 may be identified by metadata that represents a client-specific identifier, such as the identifier of a scope belonging to the client requesting the migrate operation (or a client on whose behalf the migrate operation is initiated by an administrator). The client-specific metadata may include a particular prefix (e.g., to the key in a key-value pair), and the particular prefix may indicate membership in the particular subset of data elements specified in the request. Accordingly, the change log 125 may be filtered to obtain all incremental changes 136 matching the client-specific identifier and falling within the relevant window of time. The relevant changes 136 may indicate changes to the data elements (e.g., the key-value pairs) for which the migrate operation is requested, such as additions of data elements, deletions of data elements, modifications to data elements (e.g., modifications to values in key-value pairs), additions of scopes, deletions of scopes, modifications to scopes, and/or other suitable changes. The subset of the incremental changes 136 retrieved from the change log 125 may then be migrated to the multi-tenant data store 172. In one embodiment, the incremental changes may be migrated by replaying or publishing them into the appropriate scopes(s) or other data structures in the data store 172.

Figure 3:
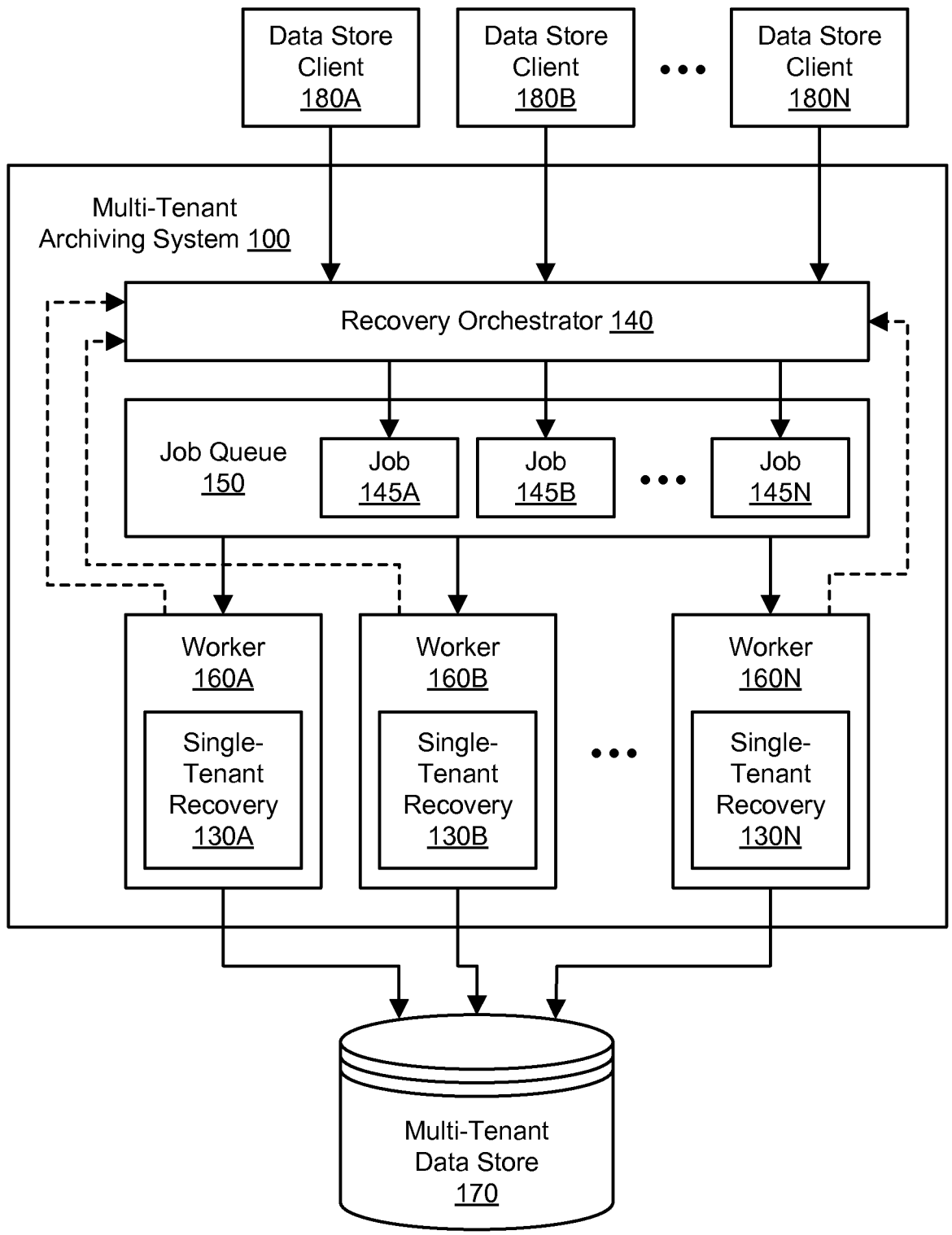
FIG. 3 illustrates further aspects of the example system environment for single-tenant recovery with a multi-tenant archive, including a fleet of workers that implement single-tenant recovery jobs, according to one embodiment.

FIG. 3 illustrates further aspects of the example system environment for single-tenant recovery with a multi-tenant archive, including a fleet of workers that implement single-tenant recovery jobs, according to one embodiment. In one embodiment, the recovery process may be implemented in a distributed manner using a fleet of workers that take recovery jobs from a queue. The fleet of workers may include a plurality of computing devices such as workers 160A and 160B through 160N. Although three workers 160A, 160B, and 160N are shown for purposes of illustration and example, it is contemplated that any suitable number and configuration of workers may interact with multi-tenant data store 170 and/or multi-tenant archiving system 100. The workers 160A-160N may be implemented using any suitable number and configuration of computing devices, any of which may be implemented by the example computing device 3000 illustrated in FIG. 8. The workers 160A-160N may be located in any suitable number of data centers or geographical locations and may communicate with the multi-tenant data store 170, job queue 150, and other components of the multi-tenant archiving system 100 using one or more networks, e.g., network(s) 190.

In one embodiment, any of the data store clients 180A-180N may send restore requests to the multi-tenant archiving system 100. In one embodiment, an administrator may generate one or more restore requests and send them to the multi-tenant archiving system 100. In one embodiment, a recovery orchestrator 140 may manage or oversee aspects of the single-tenant recovery process. For example, the recovery orchestrator 140 may receive the restore requests from clients or administrators and generate corresponding restore jobs. Each restore job may include one or more instructions to restore the requested subset of the data elements to their state at the requested point in time. In one embodiment, a restore job may identify the partition of the data to be restored as well as one or more scopes to be restored. In one embodiment, a restore job may also indicate the target data store and/or source data store, e.g., for migration of data elements from one data store to another. As the restore jobs are generated, the recovery orchestrator 140 may place them in a job queue 150. At any given time, the job queue may include zero or more restore jobs such as jobs 145A and 145B through 145N. Although three jobs 145A, 145B, and 145N are shown for purposes of illustration and example, it is contemplated that any suitable number and configuration of jobs may be held in the queue 150.

In one embodiment, an external queue service may manage the queue 150 in which the restore jobs 145A-145N are placed. Although one queue 150 is shown for purposes of illustration and example, any suitable number of queues may be used to hold the restore jobs 145A-145N. For example, different queues may have different levels of priority. The queue service may use a fault-tolerance scheme in which jobs are made invisible after being picked up by a worker but maintained in the queue until the job is actually completed; if a worker fails, the invisible job may be made visible again and provided to another worker.

When a particular worker of the fleet of workers 160A-160N is ready to take a restore job, the restore job may be sent from the queue 150 to the particular worker. The worker may then implement any tasks necessary to perform the restore job. The workers 160A-160N may take restore jobs from the queue 150 and perform the corresponding operations by implementing the single-tenant recovery functionality 130. Accordingly, worker 160A may include a single-tenant recovery functionality 130A, worker 160B may include a single-tenant recovery functionality 130B, and worker 160N may include a single-tenant recovery functionality 130N. For example, a worker may retrieve the client-specified subset of data elements from the relevant snapshot, retrieve the relevant incremental changes from the change log, and restore the data elements and incremental change to the multi-tenant data store 170. Individual workers may provide status updates (e.g., concerning the status of restore jobs, e.g., success or failure) to a centralized entity such as the recovery orchestrator 140.

In one embodiment, the data store 170 may include a plurality of partitions. Each data element (e.g., key-value pair) and data structure (e.g., scope) partition may be part of one and only one partition. Individual partitions may be assigned to individual workers. In one embodiment, a single worker may be responsible for one partition or multiple partitions. The recovery orchestrator 140 may keep track of the mapping of partitions to workers and may generate the jobs 145A-145N with suitable metadata so that the jobs are made available in the queue to appropriate workers. If a particular worker has already been assigned one or more partitions, then that worker may poll the queue 150 for jobs that relate to the assigned partition(s). If a particular worker has not already been assigned any partitions, then that worker may poll the queue 150 for jobs that relate to unassigned partitions; when the worker takes such a job, the worker may send an update to the recovery orchestrator 140 to confirm and register the assignment of the partition to the worker. Partitions may be assigned or reassigned to workers at any suitable point, e.g., when new partitions are added to the data store 170, when the first restore request for a partition is received, or when a worker that previously handled the partition fails.

In one embodiment, the size of the worker fleet may grow or shrink to meet demand for restore jobs, e.g., using an auto-scaling functionality. The size of the fleet may grow or shrink on any suitable basis, such as the size of the queue that holds restore jobs and/or performance metrics for the workers. For example, additional workers may be provisioned if the queue length exceeds a particular threshold. As another example, existing workers may be deprovisioned if a short queue length and/or worker metrics indicate that workers are being underutilized. The maximum number of concurrent jobs for a worker may be configurable.

In one embodiment, data elements may be migrated from one data store to another data store in substantially the same manner as shown in FIG. 3, e.g., using the fleet of workers 160A-160N. Accordingly, the workers 160A-160N may take migration jobs from the queue 150 and perform the corresponding operations by implementing the single-tenant migration functionality 131. In this manner, the workers 160A-160N may migrate client-specific elements from a source data store to a target data store using an archive of the client-specific elements as an intermediary.

Figure 4:
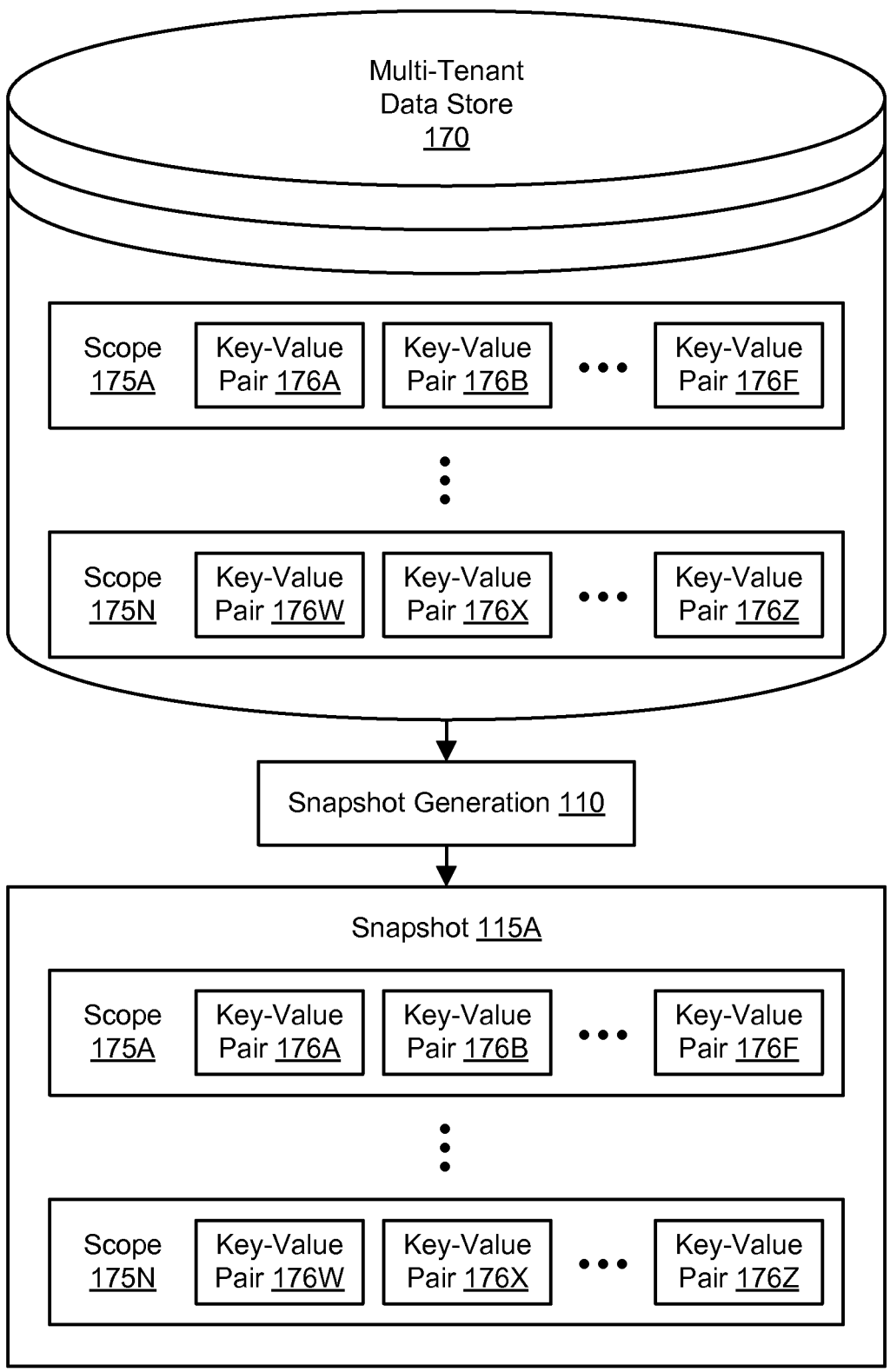
FIG. 4 illustrates snapshot generation for single-tenant recovery with a multi-tenant archive, according to one embodiment.

FIG. 4 illustrates snapshot generation for single-tenant recovery with a multi-tenant archive, according to one embodiment. As discussed above, the snapshot generation functionality 110 may generate and store a plurality of snapshots of the multi-tenant data store, including snapshot 115A. The multi-tenant data store 170 may include a plurality of data elements that are provided by and stored on behalf of a plurality of clients. In one embodiment, the data elements may include key-value pairs, and each key-value pair may belong to at least one data structure referred to as a scope. As shown in the example of FIG. 4, the data store may include a plurality of scopes such as scopes 175A through 175N. Although two scopes 175A-175N are shown for purposes of illustration and example, it is contemplated that any suitable number and configuration of scopes may be stored in the data store 170. The scopes may be client-specific, such that scope 175A may be owned by one client, and scope 175N may be owned by another client. At a particular point in time, scope 175A may include a set of key-value pairs such as key-value pairs 176A and 176B through 176F. At the same point in time, scope 175N may include a different set of key-value pairs such as key-value pairs 176W and 176X through 176Z. It is contemplated that any suitable number and configuration of key-value pairs may be stored in the scopes 175A-175N.

In one embodiment, the snapshot 115A may include all or substantially all of the data elements stored in the data store 170 at the particular point in time at which the snapshot was captured, including data elements owned by multiple clients. Accordingly, when the snapshot 115A is generated at the particular point in time, the snapshot may include the same scopes 175A-175N as stored in the multi-tenant data store at that point in time. Additionally, the snapshot 115A may include the same key-value pairs 176A-176F and 176W-176Z as stored in the multi-tenant data store at that point in time. In the snapshot 115A, the data elements may not be segregated or partitioned by client; in other words, archived data for one client may be mixed or interleaved with archived data for other clients within a snapshot.

In one embodiment, the data store 170 may include a plurality of partitions, and the snapshot 115A may include a plurality of partition snapshots. Each of the partition snapshots may include contents (e.g., data elements) of one or more corresponding partitions at the time the snapshot was taken. For the snapshot 115A, the creation dates of the constituent partition snapshots may vary. The data elements for a particular client may be distributed among multiple partitions, and some partitions may include data elements for other clients in addition to data elements for the particular client.

Figure 5:
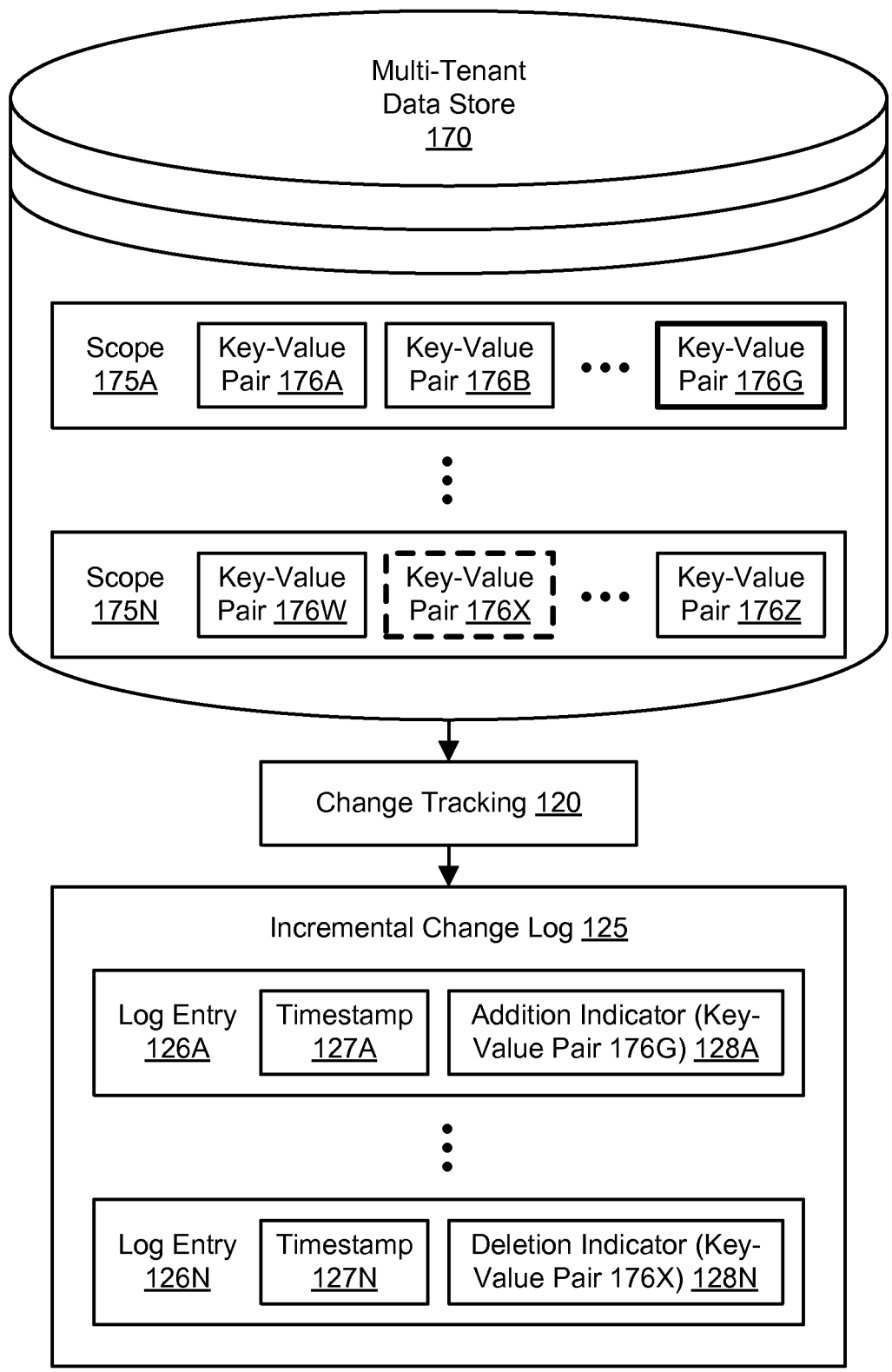
FIG. 5 illustrates change tracking for single-tenant recovery with a multi-tenant archive, according to one embodiment.

FIG. 5 illustrates change tracking for single-tenant recovery with a multi-tenant archive, according to one embodiment. As discussed above, the change tracking functionality 120 may capture and store a plurality of incremental changes to the multi-tenant data store 170. The incremental changes may represent changes from one snapshot to another snapshot. In one embodiment, the incremental changes may reflect changes with respect to the most recent snapshot. The incremental changes may include changes to the data elements (e.g., the key-value pairs) provided by the clients, such as additions of data elements, deletions of data elements, modifications to data elements (e.g., modifications to values in key-value pairs), additions of scopes, deletions of scopes, modifications to scopes, and/or other suitable changes. The incremental changes may include changes to data elements for a plurality of clients. The incremental changes may be stored in an incremental change log 125. In the change log 125, the data elements may not be segregated or partitioned by client; in other words, archived data for one client may be mixed or interleaved with archived data for other clients within the change log.

As shown in the example of FIG. 5, scopes 175A and 175N may have been changed since the snapshot 115A was captured. Accordingly, the change tracking functionality 120 may capture and store the changes to scopes 175A and 175N in the change log 125. For example, a new key-value pair 176G may have been added to scope 175A since the snapshot 115A was taken. The change tracking functionality 120 may capture this change in a log entry 126A. The log entry 126A may include a timestamp 127A indicating the time at which the change was made in the data store 170 or the time at which the change was detected in the data store 170. The log entry 126A may also include an addition indicator 128A that represents the change made to the scope 175A, i.e., an indication that the key-value pair 176G was added to the scope. The addition indicator 128A may include the added key and the added value.

As another example, an existing key-value pair 176X may have been removed from scope 175N since the snapshot 115A was taken. The change tracking functionality 120 may capture this change in a log entry 126N. The log entry 126N may include a timestamp 127N indicating the time at which the change was made in the data store 170 or the time at which the change was detected in the data store 170. The log entry 126N may also include a deletion indicator 128N that represents the change made to the scope 175N, i.e., an indication that the key-value pair 176X was removed from the scope. The deletion indicator 128N may include the deleted key and/or its value. In a similar manner, the change log 125 may store indications of values that are changed for particular keys as well as the addition, deletion, or modification of scopes themselves.

Figure 6:
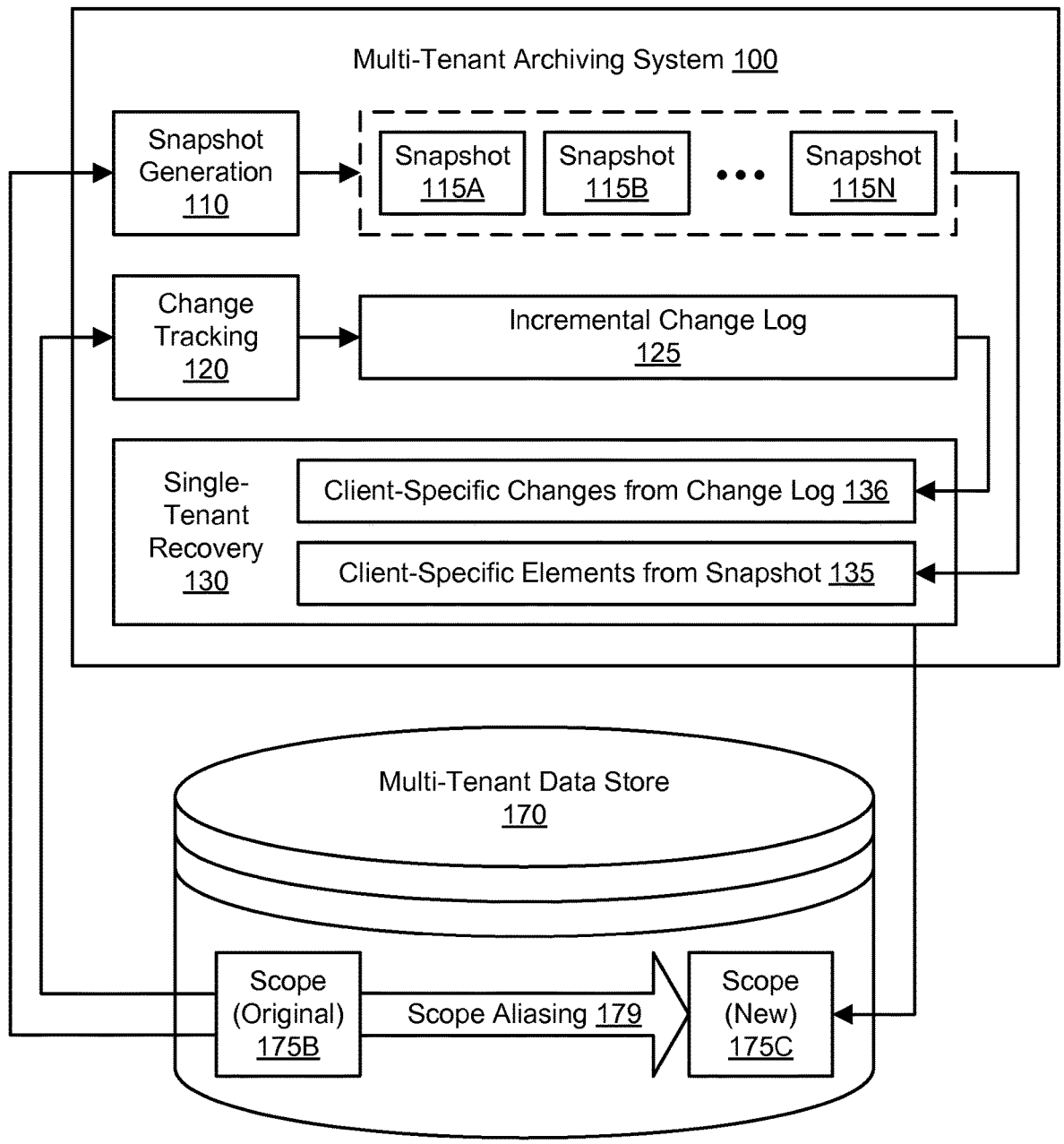
FIG. 6 illustrates scope aliasing for single-tenant recovery with a multi-tenant archive, according to one embodiment.

FIG. 6 illustrates scope aliasing for single-tenant recovery with a multi-tenant archive, according to one embodiment. In one embodiment, one or more of the snapshots 115A-115N and entries in the incremental change log 125 may be taken from an original scope 175B in the multi-tenant data store 170. When the requested data elements and related changes from the original scope 175B are restored to the data store 170, the data may be placed in a new scope 175C rather than in the original scope 175B. In one embodiment, the new scope 175C may be generated with a name that is similar to or otherwise based on the name of the original scope 175B. For example, if the name of the original scope 175B is "scope-name," then the new scope 175C may be named "scope-name/restore" in the multi-tenant data store 170. In one embodiment, the original scope 175B may be locked for additional modification while the restore operation is performed.

Using a scope aliasing functionality 179 of the data store 170, the original scope 175B may be made to point to the new scope 175C. To accomplish this scope aliasing 179, the original scope 175B may be made an alias for the new scope 175C. In one embodiment, any operation to read, write, modify, or otherwise access the original scope 175B may then be automatically redirected to the new scope 175C. The aliasing operation may be referred to as a scope flip. In one embodiment, the scope flip may be performed following one or more restore operations when all of the restore operations have been completed and no restore operations are currently being performed. Status updates from the workers 160A-160N to the recovery orchestrator 140 may be used to determine when to perform the scope flip. In this manner, data elements may be safely restored to a live data store 170. In one embodiment, scope aliasing 179 may not be used, and both the original scope 175B and the new scope 175C may be accessible to the client in the data store 170, e.g., upon request from the client to leave the old scope 175B.

Figure 7A:
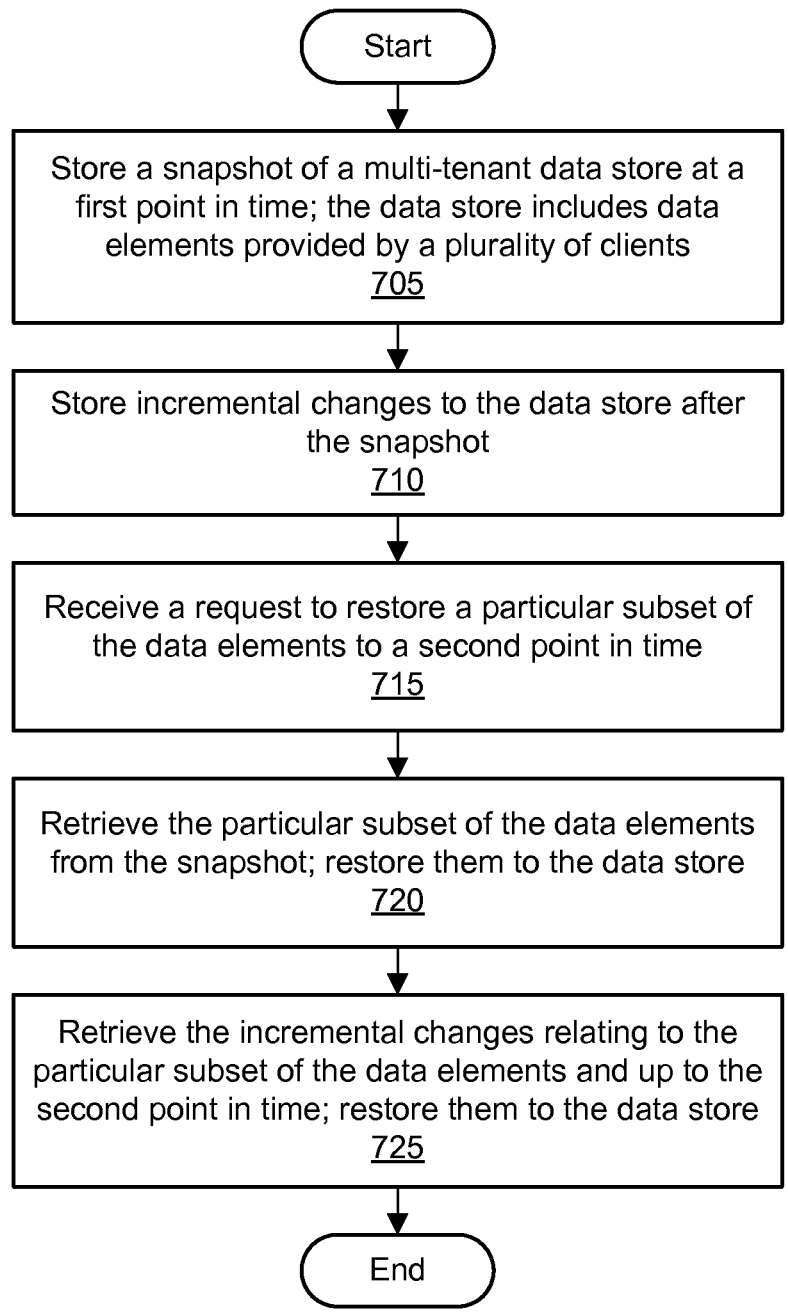
FIG. 7A is a flowchart illustrating a method for single-tenant recovery with a multi-tenant archive, according to one embodiment.

FIG. 7A is a flowchart illustrating a method for single-tenant recovery with a multi-tenant archive, according to one embodiment. As shown in 705, a snapshot of a multi-tenant data store may be generated and stored at a particular point in time. The multi-tenant data store may include a plurality of data elements that are provided by and stored on behalf of a plurality of clients. In one embodiment, the data elements may include key-value pairs, and each key-value pair may belong to at least one data structure referred to as a scope. The scopes may be client-specific. The snapshot may include all of the data elements stored in the data store at the particular point in time, including data elements for many clients (also referred to as tenants). In the snapshot, the data elements may not be segregated or partitioned by client; in other words, archived data for one client may be mixed or interleaved with archived data for other clients within the snapshot. The snapshot may be generated based on a schedule or otherwise on a recurring basis. Accordingly, a plurality of such snapshots may be generated and stored at a plurality of points in time.

As shown in 710, a plurality of incremental changes to the multi-tenant data store may be captured and stored. The incremental changes may represent changes from one snapshot to another snapshot. In other words, the incremental changes may reflect changes with respect to the most recent snapshot, e.g., the snapshot taken in 705. The incremental changes may include changes to the data elements (e.g., the key-value pairs) provided by the clients, such as additions of data elements, deletions of data elements, modifications to data elements (e.g., modifications to values in key-value pairs), additions of scopes, deletions of scopes, modifications to scopes, and/or other suitable changes. The incremental changes may include changes to data elements for a plurality of clients. The incremental changes may be stored in an incremental change log. In the change log, the data elements may not be segregated or partitioned by client; in other words, archived data for one client may be mixed or interleaved with archived data for other clients within the change log. The snapshot(s) and change log may be maintained by an archiving system.

As shown in 715, a request to restore data may be received, e.g., by the archiving system. The request may be issued by or on behalf of a particular client. The request may specify a particular subset of the data elements to restore to the multi-tenant data store. For example, the request may specify one or more particular scopes or other collections of key-value pairs to be restored. The specified subset of data elements may be client-specific, and the particular subset may belong to the client who issued the request. The request may also specify a particular (second) point in time for the restore operation. By specifying the second point in time, the request may represent an instruction to restore the specified subset of data elements to their state in the data store at that second point in time. The second point in time indicates a time after the first point in time, e.g., a time after the snapshot was taken in 705.

As shown in 720, the specified subset of data elements may be retrieved from the relevant snapshot stored in the archiving system. If the archiving system maintains a plurality of snapshots, then the most recent snapshot taken prior to the second point in time may be selected. The individual data elements in the snapshot may be identified by metadata that represents a client-specific identifier, such as the identifier of a scope belonging to the client requesting the restore operation. The client-specific metadata may include a particular prefix (e.g., to the key in a key-value pair), and the particular prefix may indicate membership in the particular subset of data elements specified in the request. Accordingly, the snapshot may be filtered to obtain all data elements matching the client-specific identifier. The subset of the data elements retrieved from the snapshot may then be restored to the multi-tenant data store. In one embodiment, the data elements (e.g., key-value pairs) may be restored by replaying or publishing them into the appropriate scopes(s) or other data structures in the data store. In one embodiment, the subset of data elements may be migrated from one data store to another data store in substantially the same manner.

As shown in 725, relevant incremental changes may be retrieved from the change log stored in the archiving system. The relevant incremental changes may relate to the specified subset of data elements and may be timestamped between the first point in time (at which the relevant snapshot was taken) and the second point in time (as specified in the request to restore). The individual changes in the change log may be identified by metadata that represents a client-specific identifier, such as the identifier of a scope belonging to the client requesting the restore operation. The client-specific metadata may include a particular prefix (e.g., to the key in a key-value pair), and the particular prefix may indicate membership in the particular subset of data elements specified in the request. Accordingly, the change log may be filtered to obtain all incremental changes matching the client-specific identifier and falling within the relevant window of time (the time between the first point and the second point). The relevant changes may indicate changes to the data elements (e.g., the key-value pairs) for which the restore operation is requested, such as additions of data elements, deletions of data elements, modifications to data elements (e.g., modifications to values in key-value pairs), additions of scopes, deletions of scopes, modifications to scopes, and/or other suitable changes. The subset of the incremental changes retrieved from the change log may then be restored to the multi-tenant data store. In one embodiment, the incremental changes may be restored by replaying or publishing them into the appropriate scopes(s) or other data structures in the data store. In one embodiment, the subset of data elements may be migrated from one data store to another data store in substantially the same manner.

Figure 7B:
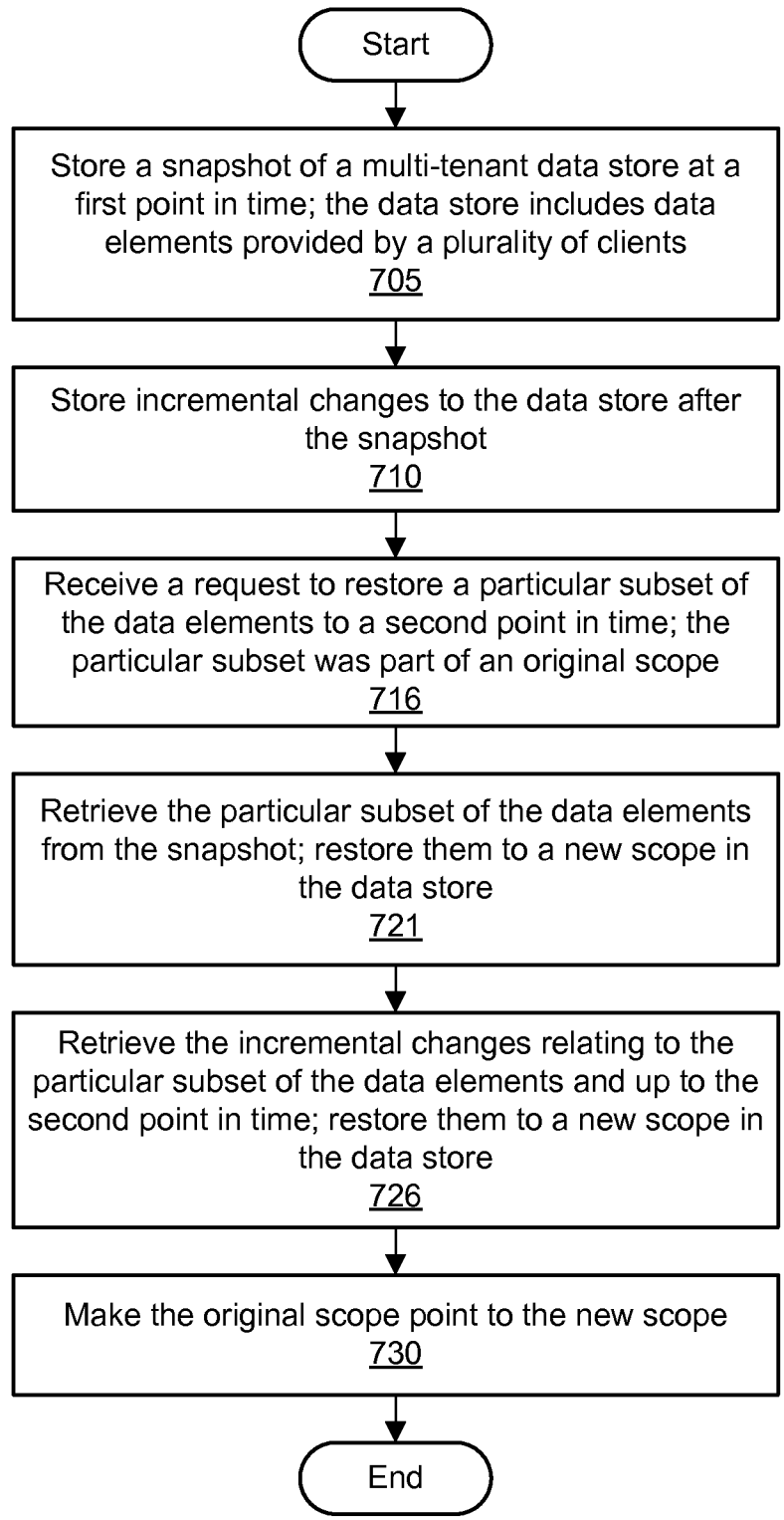
FIG. 7B is a flowchart illustrating a method for single-tenant recovery with a multi-tenant archive, including scope aliasing, according to one embodiment.

FIG. 7B is a flowchart illustrating a method for single-tenant recovery with a multi-tenant archive, including scope aliasing, according to one embodiment. As shown in 705, a snapshot of a multi-tenant data store may be generated and stored at a particular point in time. The multi-tenant data store may include a plurality of data elements that are provided by and stored on behalf of a plurality of clients. In one embodiment, the data elements may include key-value pairs, and each key-value pair may belong to at least one data structure referred to as a scope. The scopes may be client-specific. The snapshot may include all of the data elements stored in the data store at the particular point in time, including data elements for many clients (also referred to as tenants). In the snapshot, the data elements may not be segregated or partitioned by client; in other words, archived data for one client may be mixed or interleaved with archived data for other clients within the snapshot. The snapshot may be generated based on a schedule or otherwise on a recurring basis. Accordingly, a plurality of such snapshots may be generated and stored at a plurality of points in time.

As shown in 710, a plurality of incremental changes to the multi-tenant data store may be captured and stored. The incremental changes may represent changes from one snapshot to another snapshot. In other words, the incremental changes may reflect changes with respect to the most recent snapshot, e.g., the snapshot taken in 705. The incremental changes may include changes to the data elements (e.g., the key-value pairs) provided by the clients, such as additions of data elements, deletions of data elements, modifications to data elements (e.g., modifications to values in key-value pairs), additions of scopes, deletions of scopes, modifications to scopes, and/or other suitable changes. The incremental changes may include changes to data elements for a plurality of clients. The incremental changes may be stored in an incremental change log. In the change log, the data elements may not be segregated or partitioned by client; in other words, archived data for one client may be mixed or interleaved with archived data for other clients within the change log. The snapshot(s) and change log may be maintained by an archiving system.

As shown in 716, a request to restore data may be received, e.g., by the archiving system. The request may be issued by or on behalf of a particular client. The request may specify a particular subset of the data elements to restore to the multi-tenant data store. For example, the request may specify a particular scope or other collection of key-value pairs to be restored. The particular subset specified in the request may have been part of (e.g., stored in) an original scope in the data store. The specified subset of data elements may be client-specific, and the particular subset may belong to the client who issued the request. The request may also specify a particular (second) point in time for the restore operation. By specifying the second point in time, the request may represent an instruction to restore the specified subset of data elements to their state in the data store at that second point in time. The second point in time indicates a time after the first point in time, e.g., a time after the snapshot was taken in 705.

As shown in 721, the specified subset of data elements may be retrieved from the relevant snapshot stored in the archiving system. If the archiving system maintains a plurality of snapshots, then the most recent snapshot taken prior to the second point in time may be selected. The individual data elements in the snapshot may be identified by metadata that represents a client-specific identifier, such as the identifier of a scope belonging to the client requesting the restore operation. The client-specific metadata may include a particular prefix (e.g., to the key in a key-value pair), and the particular prefix may indicate membership in the particular subset of data elements specified in the request. Accordingly, the snapshot may be filtered to obtain all data elements matching the client-specific identifier. The subset of the data elements retrieved from the snapshot may then be restored to a new scope in the multi-tenant data store. In one embodiment, the data elements (e.g., key-value pairs) may be restored by replaying or publishing them into the new scope. In one embodiment, the new scope may be generated with a name that is similar to or otherwise based on the name of the original scope. For example, if the name of the original scope is "scope-name," then the new scope may be named "scope-name/restore" in the multi-tenant data store.

As shown in 726, relevant incremental changes may be retrieved from the change log stored in the archiving system. The relevant incremental changes may relate to the specified subset of data elements and may be timestamped after the relevant snapshot was taken and up to and including the second point in time (as specified in the request to restore). The individual changes in the change log may be identified by metadata that represents a client-specific identifier, such as the identifier of a scope belonging to the client requesting the restore operation. The client-specific metadata may include a particular prefix (e.g., to the key in a key-value pair), and the particular prefix may indicate membership in the particular subset of data elements specified in the request. Accordingly, the change log may be filtered to obtain all incremental changes matching the client-specific identifier and falling within the relevant window of time (the time between the first point and the second point). The relevant changes may indicate changes to the data elements (e.g., the key-value pairs) for which the restore operation is requested, such as additions of data elements, deletions of data elements, modifications to data elements (e.g., modifications to values in key-value pairs), additions of scopes, deletions of scopes, modifications to scopes, and/or other suitable changes. The subset of the incremental changes retrieved from the change log may then be restored to the new scope in the multi-tenant data store. In one embodiment, the incremental changes may be restored by replaying or publishing them into the new scope.

As shown in 730, the original scope may be made to point to the new scope in the data store. To accomplish this scope aliasing, the original scope may be made an alias for the new scope. In one embodiment, any operation to read, write, modify, or otherwise access the original scope may then be automatically redirected to the new scope. The aliasing operation may be referred to as a scope flip. In one embodiment, the scope flip may be performed following one or more restore operations when all of the restore operations have been completed and no restore operations are currently being performed. Status updates from the workers to the recovery orchestrator may be used to determine when to perform the scope flip. In this manner, data elements may be safely restored to a live data store.

Figure 7C:
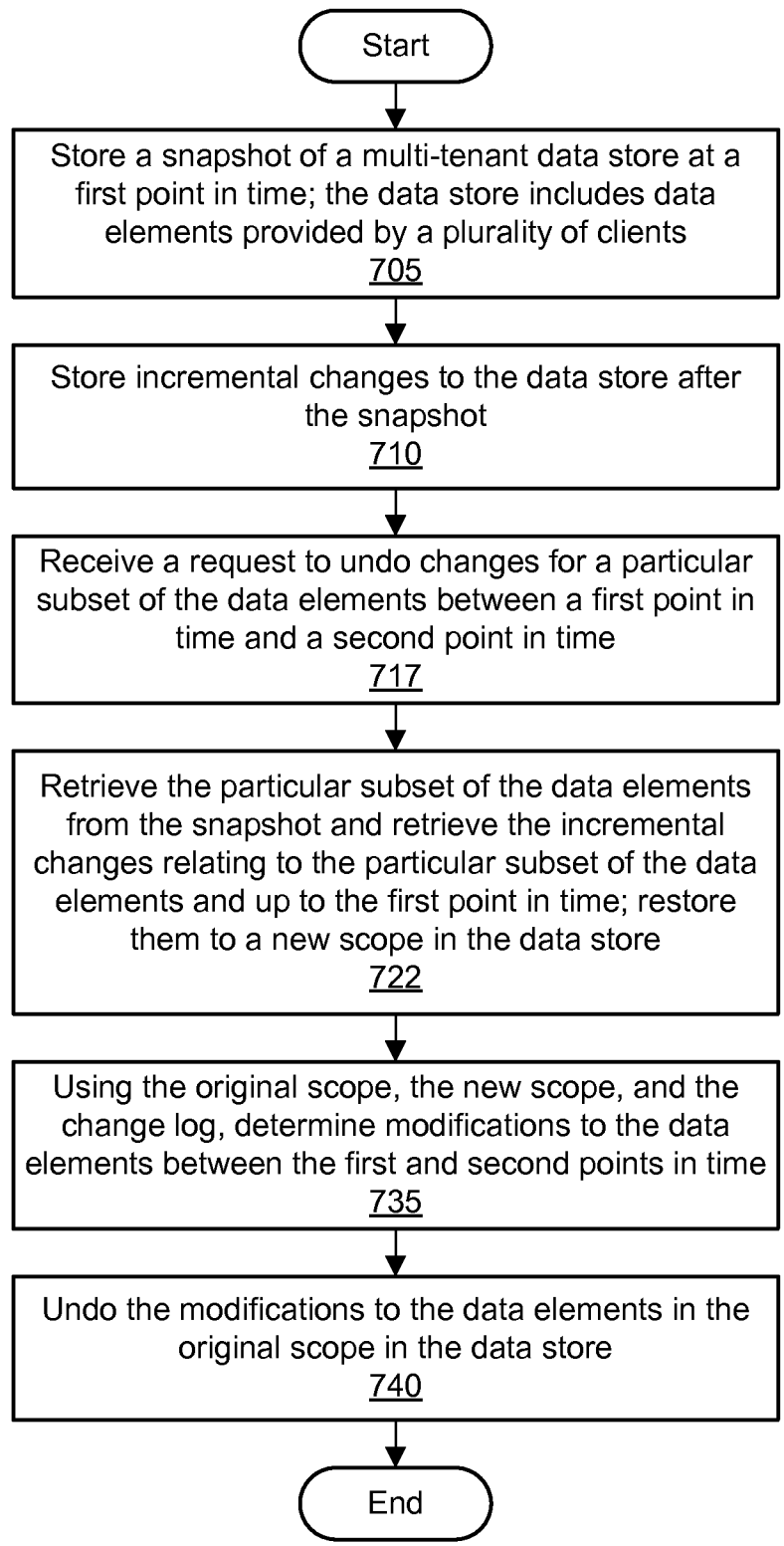
FIG. 7C is a flowchart illustrating a method for single-tenant recovery with a multi-tenant archive, including range undo, according to one embodiment.

FIG. 7C is a flowchart illustrating a method for single-tenant recovery with a multi-tenant archive, including range undo, according to one embodiment. In one embodiment, the single-tenant recovery functionality 130 may perform a range undo, e.g., to undo the changes to a portion of the data store 170 (e.g., to a particular scope) between a first point in time and a second point in time. For example, a client or administrator may seek to undo a series of erroneous updates to the data store 170 that occurred in a particular window of time. As shown in 705, a snapshot of a multi-tenant data store may be generated and stored at a particular point in time, as discussed above with respect to FIG. 7A. As shown in 710, a plurality of incremental changes to the multi-tenant data store may be captured and stored, as discussed above with respect to FIG. 7A.

As shown in 717, a request to undo changes may be received, e.g., by the archiving system. The request may be issued by or on behalf of a particular client. The request may specify a particular subset of the data elements in the multi-tenant data store. For example, the request may specify one or more particular scopes or other collections of key-value pairs. The specified subset of data elements may be client-specific, and the particular subset may belong to the client who issued the request. The request may also specify a range or window of time for the undo operation, e.g., by specifying a first point in time and a second point in time. By specifying the window of time, the request may represent an instruction to restore the specified subset of data elements to their state in the data store after that second point in time but without any changes made between the first point in time and the second point in time.

As shown in 722, the relevant portion of the data store may first be restored to its state at the first point in time using the restore techniques discussed herein, e.g., as discussed with respect to FIG. 1 through FIG. 6. Accordingly, the relevant data from the snapshot and the relevant changes from the change log (e.g., the changes from the snapshot up to the first point in time) may be placed into a new scope in the data store. In performing the range undo, the new scope may be used temporarily.

As shown in 735, it may be determined (e.g., by the single-tenant recovery functionality) which data elements (e.g., which keys in the particular scope) were modified between the first point in time and the second point in time. Additionally, it may be determined (e.g., by the single-tenant recovery functionality) which operations were performed on those data elements (e.g., "put" or "remove") between the first point in time and the second point in time. The original scope, the new scope, and the change log may be used to determine this information. A data element was created during the relevant window if it exists in the original scope (with a timestamp in the time window) but not in the new scope. A data element was updated during the relevant window if it exists in the original scope (with a timestamp in the time window) and also exists in the new scope. A data element was deleted during the relevant window if it does not exist in the original scope but does exist in the new scope and if the change log includes an indication of deletion.

As shown in 740, the changes between the first point in time and the second point in time may be undone in the original scope in the data store. For a data element (e.g., a key) that was created during the relevant window, the data element may be deleted from the original scope. In one embodiment, the data element may be deleted by performing an op lock conditional publish. For a data element (e.g., a key) that was updated during the relevant window, the update operation may be reversed by fetching the value of the data element from the new scope and placing it in the original scope. For a data element (e.g., a key) that was deleted during the relevant window, the data element may be retrieved from the new scope and placed in the original scope. In this manner, changes in a particular window of time may be undone or rolled back in the original scope.

Illustrative Computer System

Figure 8:
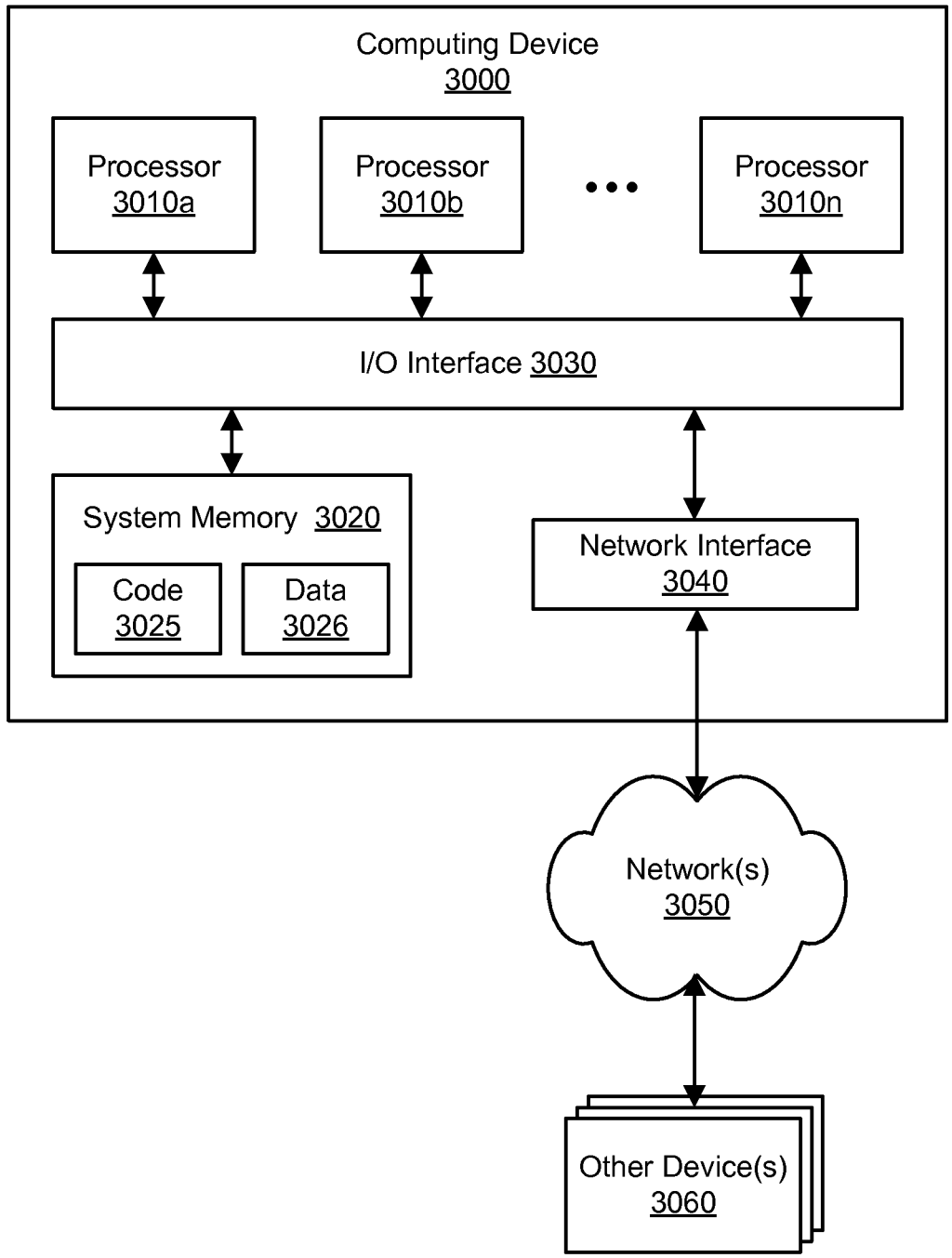
FIG. 8 illustrates an example computing device that may be used in some embodiments.

In at least some embodiments, a computer system that implements a portion or all of one or more of the technologies described herein may include a computer system that includes or is configured to access one or more computer-readable media. FIG. 8 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement a multi-tenant archiving system, wherein the multi-tenant archiving system is configured to:
store a plurality of snapshots of a multi-tenant data store at a plurality of points in time, wherein the multi-tenant data store comprises a plurality of key-value pairs provided by a plurality of clients;
store a plurality of incremental changes to the multi-tenant data store between individual ones of the plurality of snapshots, wherein the plurality of incremental changes comprise a plurality of changes to individual ones of the plurality of key-value pairs provided by the plurality of clients;
receive a request from a particular client of the plurality of clients to restore a particular subset of the key-value pairs to a particular point in time, wherein the request comprises information identifying the particular subset of the key-value pairs and the particular point in time, and wherein the particular subset of the key-value pairs, for which the request to restore is received, are owned by the particular client of the plurality of clients;
retrieve a particular snapshot of the plurality of snapshots, wherein the particular snapshot was stored prior to the particular point in time;
retrieve a particular subset of the incremental changes, wherein the particular subset of the incremental changes comprise incremental changes to the particular subset of the key-value pairs that are owned by the particular client of the plurality of clients, and wherein the particular subset of the incremental changes were stored after the particular snapshot was stored and up to the particular point in time; and
restore, to the multi-tenant data store, the particular subset of the key-value pairs that are owned by the particular client of the plurality of clients, from the particular snapshot and the particular subset of the incremental changes, wherein at least one key-value pair of the plurality of key-value pairs not owned by the particular client is not restored to the multi-tenant data store with the restoration of the particular subset of the key-value pairs.

2. The system as recited in claim 1, wherein the multi-tenant archiving system is further configured to:
enqueue a restore job in a queue, wherein the restore job comprises one or more instructions to restore the particular subset of the key-value pairs to the particular point in time; and
send the restore job from the queue to a particular worker of a fleet of workers; and
wherein the particular subset of the key-value pairs from the particular snapshot and the particular subset of the incremental changes are restored using the particular worker.

3. The system as recited in claim 1, wherein the multi-tenant archiving system is further configured to:
retrieve, from the particular snapshot, individual ones of the key-value pairs having a particular prefix, wherein the particular prefix indicates membership in the particular subset of the key-value pairs.

4. The system as recited in claim 1, wherein the particular subset of the key-value pairs and the particular subset of the incremental changes belong to an original scope in the multi-tenant data store, wherein the particular subset of the key-value pairs from the snapshot and the particular subset of the incremental changes are restored to a new scope in the multi-tenant data store, and wherein the multi-tenant archiving system is further configured to:
make the original scope point to the new scope in the multi-tenant data store.

5. A computer-implemented method, comprising:
receiving from a particular client of the plurality of clients a request to restore a particular subset of data elements in a data store to a second point in time, wherein the request comprises information identifying the particular subset of data elements and the second point in time, and wherein the data store comprises a plurality of data elements provided by a plurality of clients, and wherein the particular subset of the data elements are owned by the particular client of the plurality of clients;
restoring the particular subset of the data elements owned by the particular client of the plurality of clients from a snapshot of the data store, wherein the snapshot was stored at a first point in time prior to the second point in time, and wherein at least one data element of the plurality of data elements not owned by the particular client is not restored with the restoration of the particular subset of the data elements; and
restoring a particular subset of a plurality of incremental changes stored in a change log, wherein the particular subset of the incremental changes comprise incremental changes to the particular subset of the data elements owned by the particular client, wherein the particular subset of the incremental changes were stored between the snapshot and the second point in time, and wherein at least one incremental change of the plurality of incremental changes not owned by the particular client is not restored with the restoration of the particular subset of the plurality of incremental change.

6. The method as recited in claim 5, further comprising:
enqueuing a restore job in a queue, wherein the restore job comprises one or more instructions to restore the particular subset of the data elements to the second point in time; and
sending the restore job from the queue to a particular worker of a fleet of workers; and
wherein the particular subset of the data elements from the snapshot and the particular subset of the incremental changes are restored using the particular worker.

7. The method as recited in claim 6, wherein the data store comprises a plurality of partitions, and wherein individual ones of the partitions are assigned to individual ones of the workers.

8. The method as recited in claim 5, wherein restoring the particular subset of the data elements from the snapshot further comprises:

retrieving, from the snapshot, individual ones of the data elements having a particular prefix, wherein the particular prefix indicates membership in the particular subset of the data elements.

9. The method as recited in claim 5, wherein the particular subset of the data elements and the particular subset of the incremental changes belong to an original scope in the data store, and wherein the particular subset of the data elements from the snapshot and the particular subset of the incremental changes are restored to a new scope in the data store.

10. The method as recited in claim 9, further comprising: making the original scope point to the new scope in the data store.

11. The method as recited in claim 5, wherein the particular subset of the data elements from the snapshot and the particular subset of the incremental changes are restored to the data store.

12. The method as recited in claim 5, wherein the particular subset of the data elements from the snapshot and the particular subset of the incremental changes are restored to another data store.

13. The method as recited in claim 5, further comprising:
in response to receiving the request to restore the particular subset of the data elements to the second point in time, selecting the snapshot stored at the first point in time from a set of snapshots, wherein none of the other snapshots in the set of snapshots were stored between the first point in time and the second point in time.

14. A non-transitory computer-readable storage medium storing program instructions computer-executable to perform:
storing a plurality of snapshots of a data store at a plurality of points in time, wherein the data store comprises a plurality of data elements provided by a plurality of clients;
storing a plurality of incremental changes to the data store between individual ones of the plurality of snapshots, wherein the plurality of incremental changes comprise a plurality of changes to the plurality of data elements provided by the plurality of clients;
receiving a request from a particular client of the plurality of clients to undo changes to a particular subset of the data elements between a first point in time and a second point in time, wherein the request comprises information identifying the particular subset of the data elements, the first point in time and the second point in time, wherein the particular subset of the data elements, for which the request to undo is received, are owned by the particular client of the plurality of clients, and wherein the particular subset of the data elements are stored in an original scope in the data store;
restoring, to a new scope in the data store, the particular subset of the data elements owned by the particular client of the plurality of clients from a particular snapshot of the plurality of snapshots, wherein the particular snapshot was stored prior to the first point in time, and wherein at least one data element of the plurality of data elements not owned by the particular client is not restored to the new scope in the data store with the restoration of the particular subset of the data elements;
restoring, to the new scope in the data store, a particular subset of the incremental changes, wherein the particular subset of the incremental changes comprise incremental changes to the particular subset of the data elements owned by the particular client, and wherein the particular subset of the incremental changes were stored after the particular snapshot was stored and up to the first point in time;
determining one or more modifications made to the particular subset of the data elements between the first point in time and the second point in time, wherein the one or more modifications are determined based at least in part on the original scope, the new scope, and the plurality of incremental changes; and
undoing the one or more modifications in the original scope in the data store.

15. The non-transitory computer-readable storage medium as recited in claim 14, wherein the program instructions are further computer-executable to perform:
enqueuing a restore job in a queue, wherein the restore job comprises one or more instructions to restore the particular subset of the data elements to the particular point in time; and
sending the restore job from the queue to a particular worker of a fleet of workers; and
wherein the particular subset of the data elements from the particular snapshot and the particular subset of the incremental changes are restored using the particular worker, and wherein the modifications are undone using the particular worker.

16. The non-transitory computer-readable storage medium as recited in claim 15, wherein the data store comprises a plurality of partitions, and wherein individual ones of the partitions are assigned to individual ones of the workers.

17. The non-transitory computer-readable storage medium as recited in claim 14, wherein the program instructions are further computer-executable to perform:
retrieving, from the particular snapshot, individual ones of the data elements having a particular prefix, wherein the particular prefix indicates membership in the particular subset of the data elements.

18. The non-transitory computer-readable storage medium as recited in claim 14, wherein determining the one or more modifications made to the particular subset of the data elements between the first point in time and the second point in time further comprises:
determining that a particular one of the data elements was created between the first point in time and the second point in time if the particular one of the data elements exists in the original scope and does not exist in the new scope; and
wherein undoing the one or more modifications in the original scope in the data store further comprises deleting the particular one of the data elements from the original scope.

19. The non-transitory computer-readable storage medium as recited in claim 14, wherein determining the one or more modifications made to the particular subset of the data elements between the first point in time and the second point in time further comprises:
determining that a particular one of the data elements was updated between the first point in time and the second point in time if the particular one of the data elements exists in the original scope, exists in the new scope, and is represented in the plurality of incremental changes between the first point in time and the second point in time; and
wherein undoing the one or more modifications in the original scope in the data store further comprises copying the particular one of the data elements from the new scope to the original scope.

20. The non-transitory computer-readable storage medium as recited in claim 14, wherein determining the one or more modifications made to the particular subset of the data elements between the first point in time and the second point in time further comprises:
  determining that a particular one of the data elements was deleted between the first point in time and the second point in time if the particular one of the data elements does not exist in the original scope and does exist in the new scope; and
  wherein undoing the one or more modifications in the original scope in the data store further comprises copying the particular one of the data elements from the new scope to the original scope.

* * * * *